US009430582B2

(12) United States Patent
Cai et al.

(10) Patent No.: US 9,430,582 B2
(45) Date of Patent: *Aug. 30, 2016

(54) EFFICIENT METHOD OF USING XML VALUE INDEXES WITHOUT EXACT PATH INFORMATION TO FILTER XML DOCUMENTS FOR MORE SPECIFIC XPATH QUERIES

(71) Applicant: International Business Machines Corporation, Armonk, NY (US)

(72) Inventors: Mengchu Cai, San Jose, CA (US); Ruiping Li, Cupertino, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,833

(22) Filed: Jan. 26, 2015

(65) Prior Publication Data
US 2015/0199449 A1 Jul. 16, 2015

Related U.S. Application Data

(63) Continuation of application No. 11/923,652, filed on Oct. 25, 2007, now Pat. No. 8,972,377.

(51) Int. Cl.
*G06F 17/30* (2006.01)
(52) U.S. Cl.
CPC ... *G06F 17/30911* (2013.01); *G06F 17/30938* (2013.01)
(58) Field of Classification Search
CPC .................................. G06F 17/30911
USPC ........................................................ 707/711
See application file for complete search history.

(56) References Cited

U.S. PATENT DOCUMENTS

| 7,174,328 | B2 | 2/2007 | Stanoi et al. | |
|---|---|---|---|---|
| 7,346,609 | B2* | 3/2008 | Chen | G06F 17/30595 707/3 |
| 7,603,347 | B2 | 10/2009 | Thusoo et al. | |
| 2002/0123993 | A1* | 9/2002 | Chau | G06F 17/30917 707/5 |

(Continued)

OTHER PUBLICATIONS

"X2S: Translating XPath into Efficient SQL Queries", By: Jun Gao, Published 2004 http://download.springer.com/static/pdf/478/chp%253A10.1007%252F978-3-540-30466-1_20.pdf?originUrl=http%3A%2F%2Flink.springer.com%2Fchapter%2F10.1007%2F978-3-540-30466-1_20&token2=exp=1450017227~acl=%2Fstatic%2Fpdf%2F478%2Fchp%25253A10.1007%25252F978-3-540-30466-1_20.p.*

(Continued)

*Primary Examiner* — Apu Mofiz
*Assistant Examiner* — Chelcie Daye
(74) *Attorney, Agent, or Firm* — Rabindranath Dutta; Konrad, Raynes, Davda & Victor LLP

(57) ABSTRACT

A system and method is provided for query processing comprises: creating an index of a database and ordering a set of index candidates from the index into a list based on a set of heuristic rules. A query defining a query path is then reduced into a list of single path expressions. Each index candidate is matched against the list of single path expressions according to the ordering of the index candidates. The matched candidate nodes are also verified to insure that they satisfy the query path.

15 Claims, 13 Drawing Sheets

(56) References Cited

U.S. PATENT DOCUMENTS

| | | |
|---|---|---|
| 2004/0010752 A1 | 1/2004 | Chan et al. |
| 2005/0055355 A1 | 3/2005 | Murthy et al. |
| 2005/0097084 A1* | 5/2005 | Balmin ............ G06F 17/30457 707/3 |
| 2005/0114314 A1 | 5/2005 | Fan et al. |
| 2005/0228792 A1 | 10/2005 | Chandrasekaran et al. |
| 2006/0004858 A1 | 1/2006 | Tran et al. |
| 2006/0053122 A1 | 3/2006 | Korn et al. |
| 2006/0101000 A1 | 5/2006 | Hacigumus et al. |
| 2006/0106758 A1 | 5/2006 | Chen et al. |
| 2006/0184551 A1 | 8/2006 | Tarachandani et al. |
| 2007/0016604 A1 | 1/2007 | Murthy et al. |
| 2007/0043743 A1 | 2/2007 | Chen et al. |
| 2007/0043751 A1 | 2/2007 | Chen et al. |
| 2007/0112803 A1 | 5/2007 | Pettovello |
| 2007/0150504 A1 | 6/2007 | Ahmed et al. |
| 2009/0037379 A1 | 2/2009 | Bou-Diab et al. |
| 2009/0112858 A1 | 4/2009 | Zhang et al. |

OTHER PUBLICATIONS

"X2S: Translating XPath into Efficient SQL Queries", By: Jun Gao, Published 2004 http://download.springer.com/static/pdf/478/chp%253A10.1007%252F978-3-540-30466-1_20.pdf?originUrl=http%3A%2F%2Flink.springer.com%2Fchapter%2F10.1007%2F978-3-540-30466-1_20&token2=exp=1463075665~acl=%2Fstatic%2Fpdf%2F478%2Fchp%25253A10.1007%25252F978-3-540-30466-1_20.p.*

Balmin et al., "A Framework for Using Materialized Xpath Views . . . ", in Proceedings of the 30th VLVD Conf., Toronto, Canada, pp. 60-71 (2004).

Beyer et al., "DB2 Goes Hybrid: Integrating Native XML and Xquery with Relational Data and SQL", in IBM Systems Journal, 45(2): 271-298 (2006).

Gupta et al., "A Report on XML Data Indexing Techniques", in School of Computing, NU of Singapore, Lower Kent Ridge Rd., Singapore, pp. 1-30.

Li et al., "Indexing and Querying XML Data for Regular Path Expressions", in Proceedings of the 27th VLDB Conference, Roma, Italy (2001), University of Arizona, Tucson, AZ.

Wang et al., "Vist: A Dynamic Index Method for Querying XML Data by Tree Structures", in IBM TJW Research Center, Hawthorne, NY.

Office Action 1, Mar. 31, 2010, for U.S. Appl. No. 11/923,652, filed Oct. 25, 2007 by G. Zhang et al., Total 23 pp. [57.215 (OA1)].

Response to Office Action 1, Jun. 30, 2010, for U.S. Appl. No. 11/923,652, filed Oct. 25, 2007 by G. Zhang et al., Total 10 pp. [57.215 (ROA1)].

Supplemental Amendment, Jul. 16, 2010, for U.S. Appl. No. 11/923,652, filed Oct. 25, 2007 by G. Zhang et al., Total 8 pp. [57.215 (SuppAmend)].

Notice of Non-Compliant Amendment, Sep. 24, 2010, for U.S. Appl. No. 11/923,652, filed Oct. 25, 2007 by G. Zhang et al., Total 3 pp. [57.215 (NNCA)].

Response to Notice of Non-Compliant Amendment, Oct. 25, 2010, for U.S. Appl. No. 11/923,652, filed Oct. 25, 2007 by G. Zhang et al., Total 12 pp. [57.215 (RNNCA)].

Final Office Action 1, Dec. 22, 2010, for U.S. Appl. No. 11/923,652, filed Oct. 25, 2007 by G. Zhang et al., Total 12 pp. [57.215 (FOA1)].

Notice of Appeal and Pre-Appeal Brief Request for Review, Mar. 22, 2011, for U.S. Appl. No. 11/923,652, filed Oct. 25, 2007 by G. Zhang et al., Total 7 pp. [57.215 (NtcAl & PreAplBrf)].

Panel Decision, Apr. 26, 2011, for U.S. Appl. No. 11/923,652, filed Oct. 25, 2007 by G. Zhang et al., Total 2 pp. [57.215 (PanelDec)].

Appeal Brief, May 26, 2011, for U.S. Appl. No. 11/923,652, filed Oct. 25, 2007 by G. Zhang et al., Total 24 pp. [57.215 (AplBrf)].

Examiner's Answer, Jul. 15, 2011, for U.S. Appl. No. 11/923,652, filed Oct. 25, 2007 by G. Zhang et al., Total 13 pp. [57.215 (Exmr'sAnswer)].

Reply Brief, Sep. 15, 2011, for U.S. Appl. No. 11/923,652, filed Oct. 25, 2007 by G. Zhang et al., Total 10 pp. [57.215 (ReplyBrf)].

Notice of Allowance, Oct. 24, 2014, for U.S. Appl. No. 11/923,652, filed Oct. 25, 2007 by G. Zhang et al., Total 6 pp. [57.215 (NOA)].

* cited by examiner

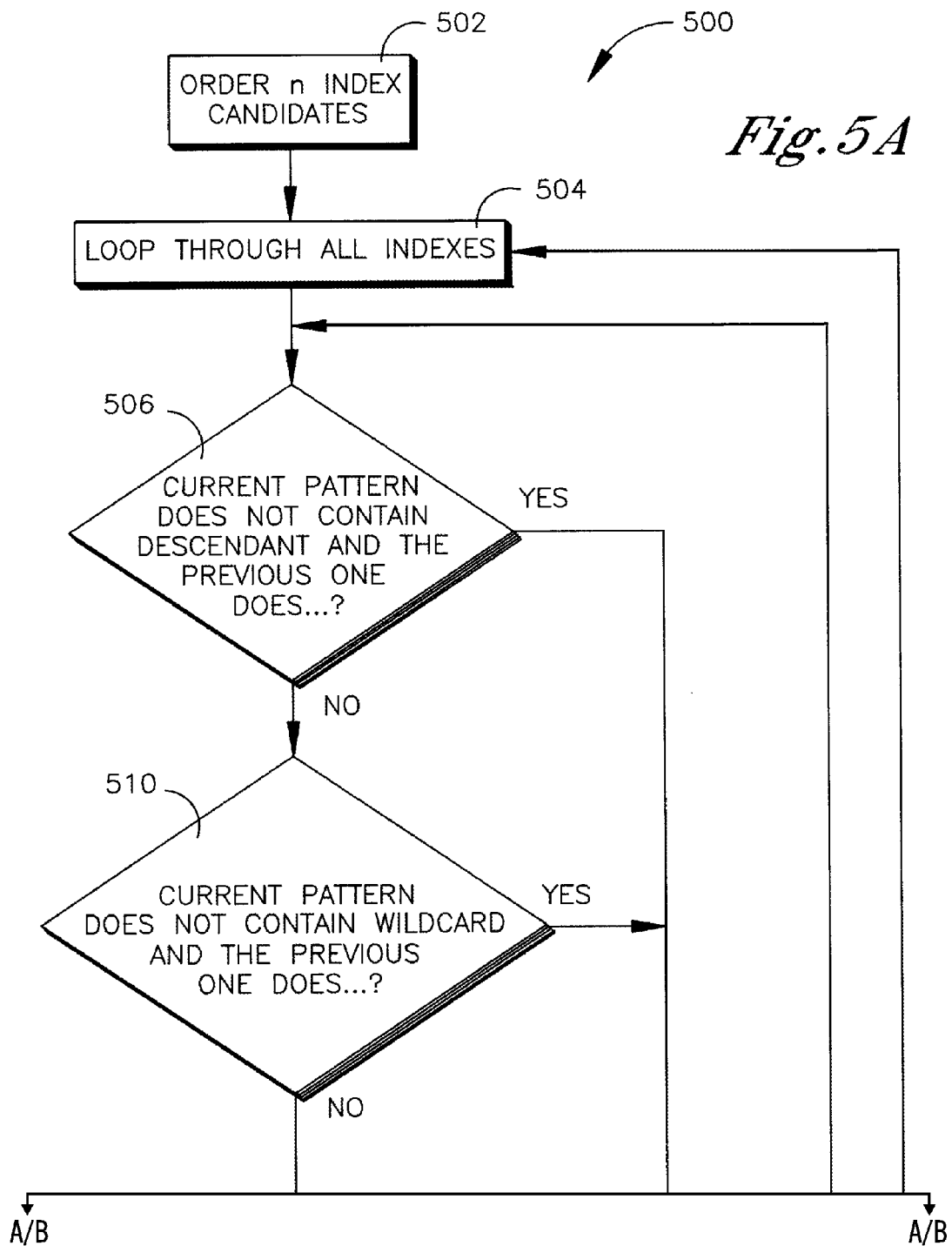

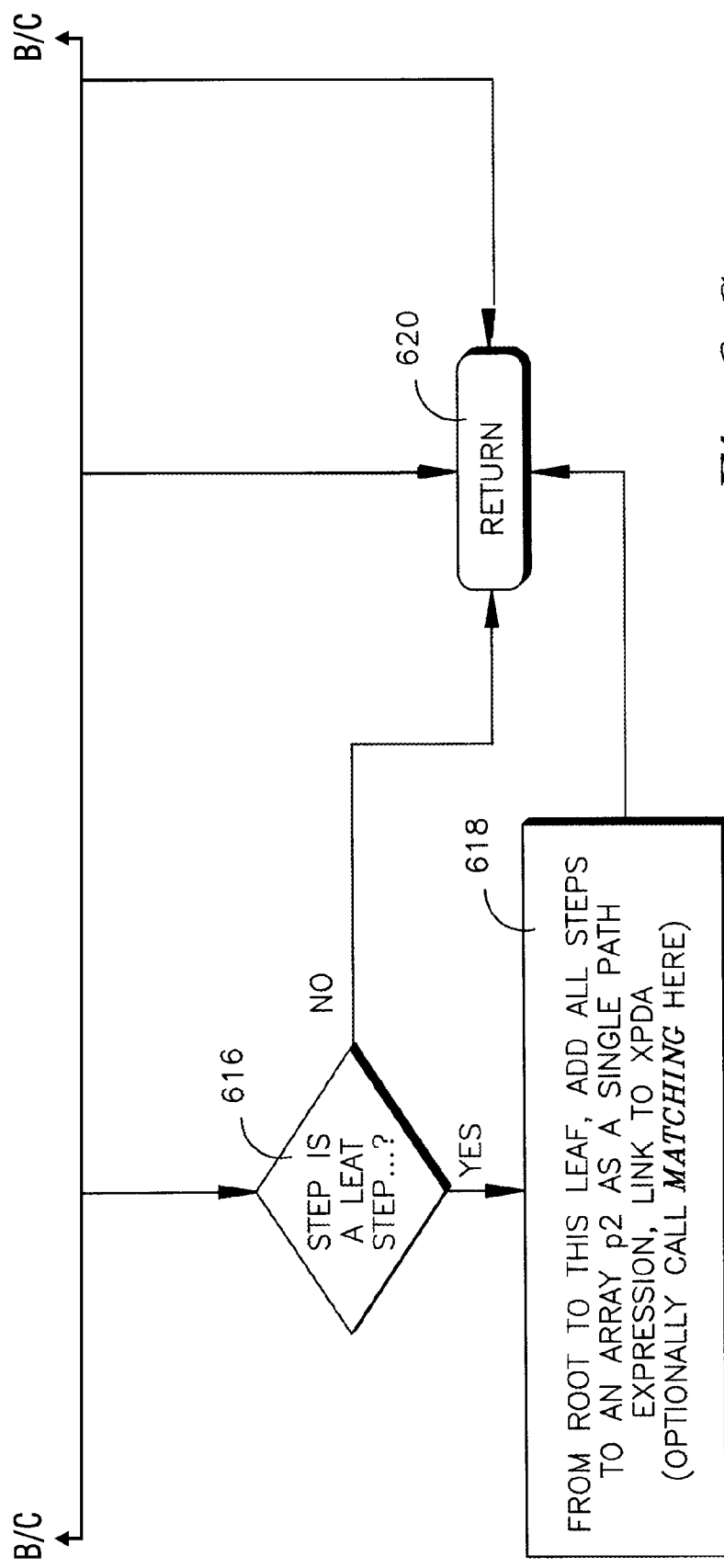

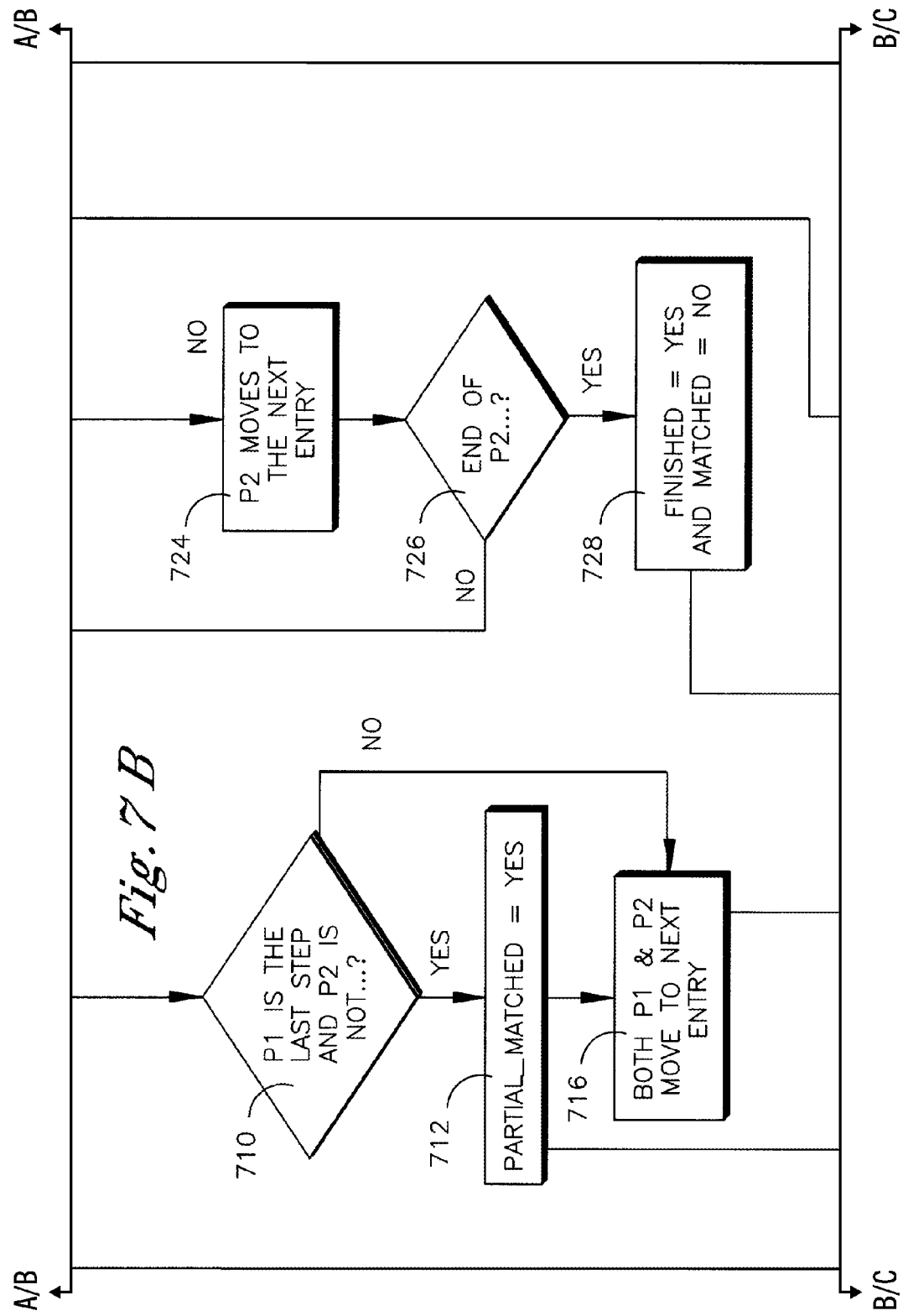

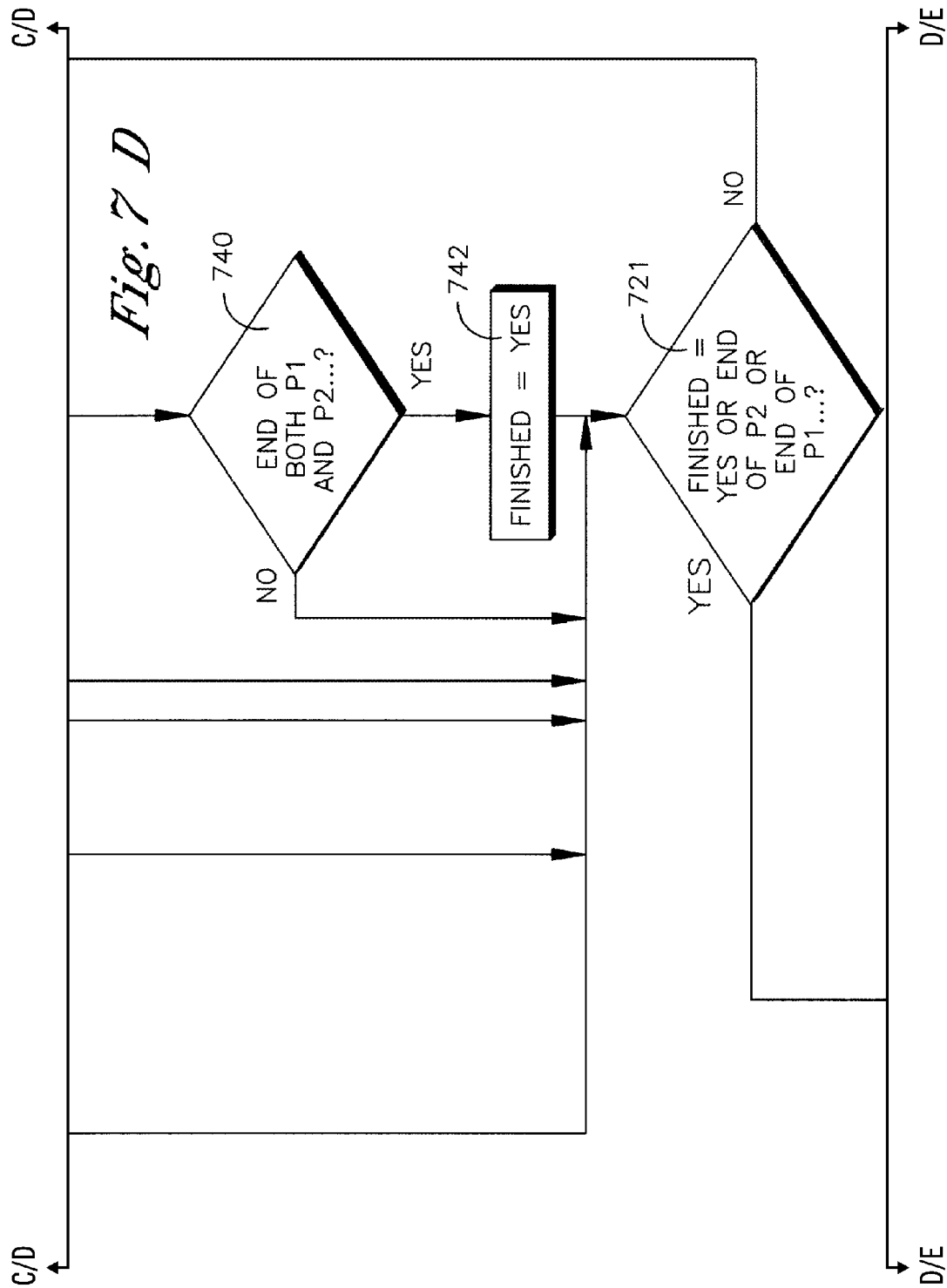

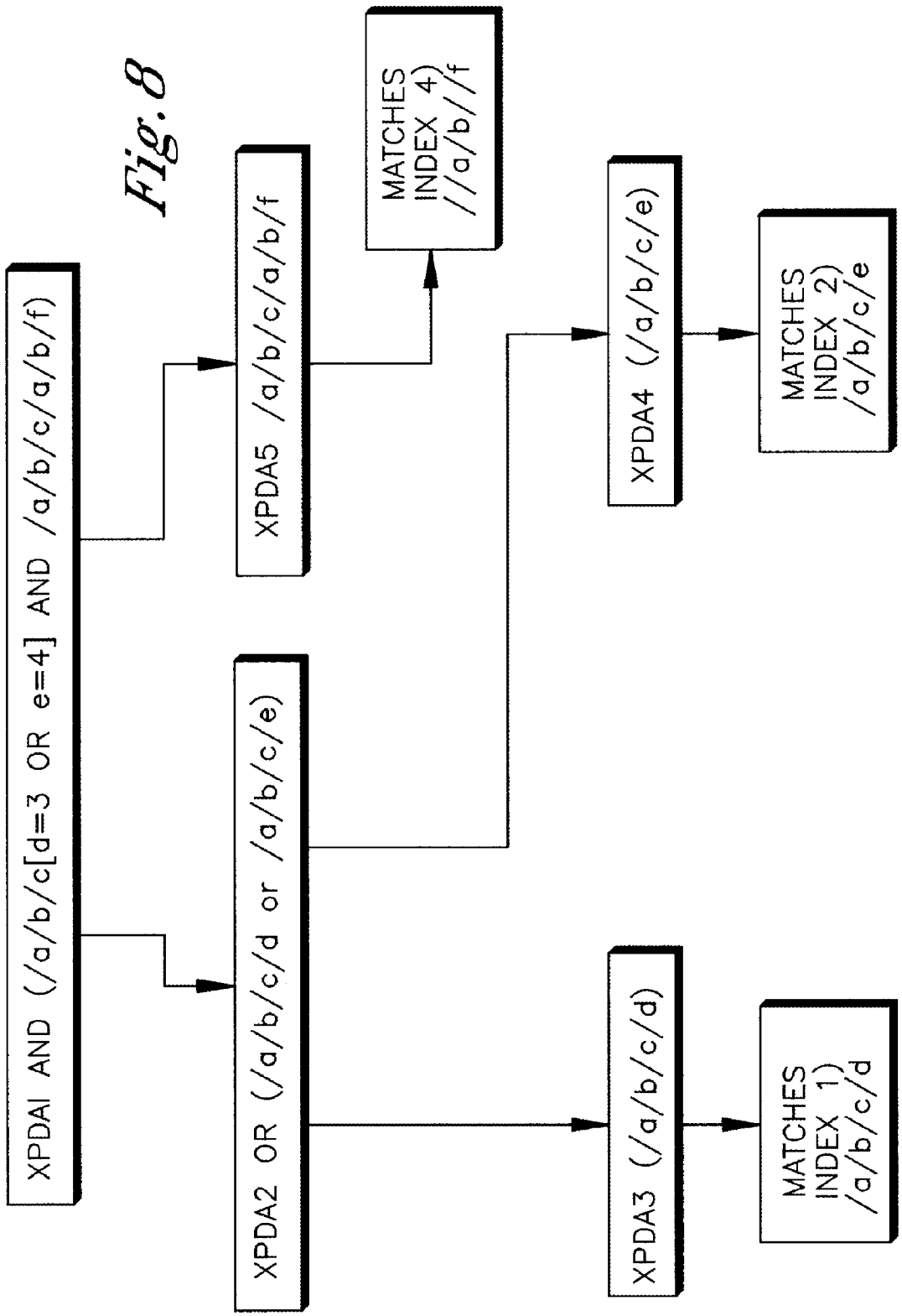

EFFICIENT METHOD OF USING XML VALUE INDEXES WITHOUT EXACT PATH INFORMATION TO FILTER XML DOCUMENTS FOR MORE SPECIFIC XPATH QUERIES

CROSS-REFERENCE TO RELATED APPLICATION

This application is a continuation of U.S. patent application Ser. No. 11/923,652, filed Oct. 25, 2007, which application is incorporated herein by reference in its entirety.

FIELD OF INVENTION

The present invention generally relates to computer implemented database management systems, and particularly to systems and methods for processing of queries to Extensible Markup Language (XML) documents using XML value indexes.

BACKGROUND

XML is a versatile markup language, capable of labeling the information content of diverse data sources including structured and semi-structured documents, relational databases, and object repositories. As increasing amounts of information are stored, exchanged, and presented using XML, the ability to intelligently query XML data sources becomes increasingly important. One of the great strengths of XML is its flexibility in representing many different kinds of information from diverse sources. To exploit this flexibility, an XML query language must provide features for retrieving and interpreting information from these diverse sources. A query language that uses the structure of XML intelligently can express queries across all these kinds of data, whether physically stored in XML or viewed as XML via middleware.

A query language called XQuery, is designed to be broadly applicable across many types of XML data sources. XQuery is designed to meet the requirements identified by the W3C XML Query Working Group. It is designed to be a language in which queries are concise and easily understood. It is also flexible enough to query a broad spectrum of XML information sources, including both databases and documents.

XPath is the W3C recommendation for navigating XML documents. Xpath is a search and extraction language designed to be embedded in a host XML language such as XQuery, XSLT and SQL/XML. Xpath expressions often define complicated navigation, resulting in expensive query processing, especially when executed over large collections of documents. As a result, indexes are critical for performance and scalability. However, XML indexes may take large storage spaces, and their maintenance is computationally expensive. When XML indexes are too complex, they will negatively impact system performance. Therefore simple and efficient XML indexes are preferred.

One type of XML index is the XML value index, which is created by specifying an XPath pattern, such as /catalog/category/product/description, or /catalog//description. The XPath patterns may be limited to XPath path expressions without predicates, i.e. a single-path tree in the XPath tree representation. The index entries contain associations of a typed key value from XML nodes, identified by the XPath pattern, to node identities (DocID and NodeID) and record IDs (RIDs) of the XML nodes in the storage. Note that a single value can have many nodes corresponding to it unless the index is unique. Index entries can be organized in a traditional B+ tree index. The search on the index is using the key values only, and provides mapping from a value to node identities (DocID, NodeID) and RIDs.

An XML database usually receives many diverse XML queries. XQuery queries can be decomposed into basic XPath queries, so it is useful to only focus on XPath queries. When an XPath query uses an index, there can be two cases: exact match or inexact match. In an exact match, the XPath query matches the XPath pattern of the index and the index provides the exact result for the query predicate. In an inexact match, the index contains (more than) the result of the query predicate. For example, the index pattern may contain a descendant axis while the query does not. If we were to allow XPath queries to use only exactly matched XML value indexes, we would require an XML database to create too many XML value indexes. To limit the number of indexes created, it is important to use XML value indexes that may contain more than the results of queries, i.e. use indexes for more specific queries.

There are various existing approaches in solving the problem of using indexes for inexact matching queries. One approach is to create more value indexes that will match queries exactly. This approach, however, is not feasible as there are too many queries for indexes to cover. Another approach is to create more index types, such as Path indexes, Path-value indexes, which includes more path information in the indexes that can be used to check equivalence relationship from containment relationship (inexact match). As pointed out above, including more information in indexes will use more storage, and cost more in maintenance.

Accordingly, there is a need for systems and methods for increasing the efficiency of the processing of Xpath and XQuery queries. There is also a need for a method to efficiently use XML value indexes for XPath and XQuery queries that do not exactly match with the index XPath patterns in a way that does not take large storage space and which does not computationally expensive maintenance.

SUMMARY OF THE INVENTION

To overcome the limitations in the prior art briefly described above, the present invention provides a method, computer program product, and system for querying an XML document.

In one embodiment of the present invention a method for query processing comprises: creating an index of a database; ordering a set of index candidates from the index into a list based on heuristic rules; reducing a query defining a query path into a list of single path expressions; matching each index candidate against the list of single path expressions according to the ordering of the index candidates; and verifying that the matched candidate nodes satisfy the query path.

In another embodiment of the present invention, a method for querying an XML document comprises: creating an XML value index of the XML document, the XML value index containing at least the following index entries: key-value, DocID, NodeID and Record ID; ordering a set of XPath pattern index candidates from the XML value index into a list based on heuristic rules; reducing an XPath query defining a query path into a list of single path XPath expressions; and matching each XML index candidate against the list of single path XPath expressions according to the ordering of the XPath pattern index candidates using a backtracking process to find if the XPath pattern index contains exactly or more than the result of an XPath query.

In a further embodiment of the present invention a method of using inexact matching XML value indexes for XPath queries comprises: ordering the XML value indexes into a list of XPath pattern index candidates into a list based on a plurality of heuristic rules; reducing the XPath query a list of single path XPath expressions including AND/OR relationships; matching each index candidate against the list of single path expressions according to the ordering of the index candidates; determining when the inexact matches become exact matches; and verifying that the matched candidate nodes satisfy the query path.

In an additional embodiment of the present invention comprises an article of manufacture for use in a computer system tangibly embodying computer instructions executable by the computer system to perform process steps for querying an XML document, the process steps comprising: creating an index of the XML document; ordering a set of index candidates from the index into a list based on heuristic rules; reducing a query defining a query path into a list of single path expressions; matching each index candidate against the list of single path expressions according to the ordering of the index candidates; and verifying that the matched candidate nodes satisfy the query path.

Various advantages and features of novelty, which characterize the present invention, are pointed out with particularity in the claims annexed hereto and form a part hereof. However, for a better understanding of the invention and its advantages, reference should be make to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 5A and FIG. 5B show a flow chart of a method of ordering index candidates in accordance with an embodiment of the invention;

FIG. 6A, FIG. 6B and FIG. 6C show a flow chart of a method of reducing XPath query into single path expressions in accordance with an embodiment of the invention;

FIG. 7A, FIG. 7B, FIG. 7C, FIG. 7D, and FIG. 7E show a flow chart of a method of matching an index pattern with an XPath query path in accordance with an embodiment of the invention; and FIG. 8 shows a tree representation of the results of matching an index pattern with an XPath query path in accordance with an embodiment of the invention.

DETAILED DESCRIPTION OF THE INVENTION

Figure 1:
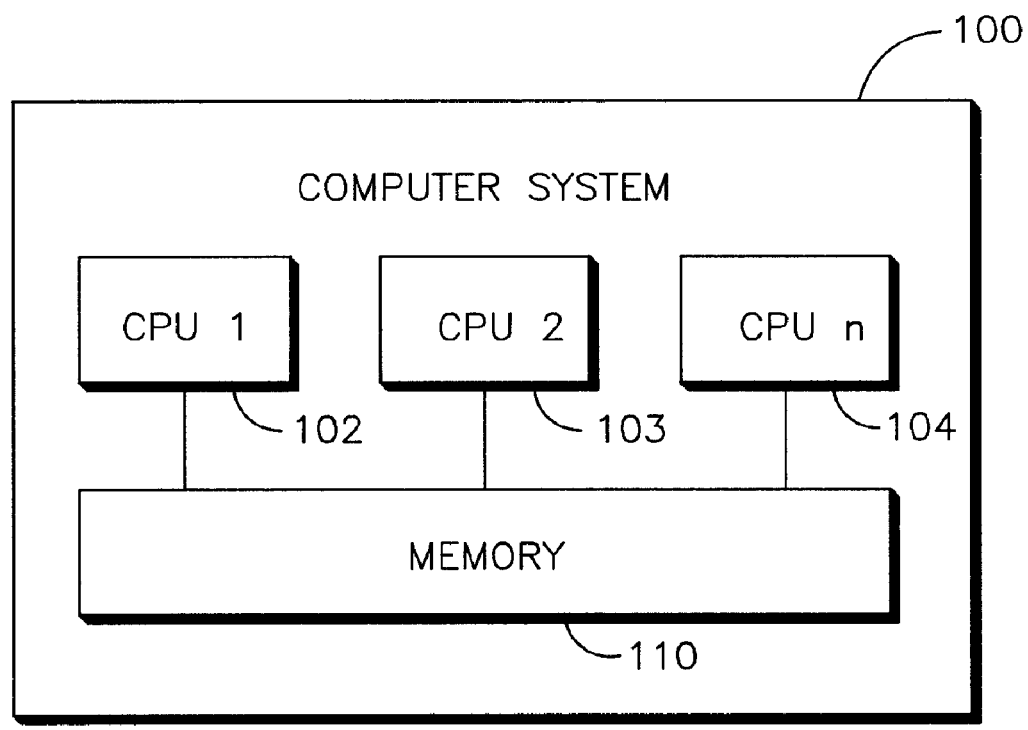
FIG. 1 is a block diagram of a typical computer system wherein the present invention may be practiced.

The present invention overcomes the problems associated with the prior art by teaching a system, computer program product, and method for using XML value indexes without exact path information to filter XML documents for more specific XPath queries. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The various elements and embodiments of invention can take the form of an entirely hardware embodiment, an entirely software embodiment or an embodiment containing both hardware and software elements. Elements of the invention that are implemented in software may include but are not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram of a computer system 100, in which teachings of the present invention may be embodied. The computer system 100 comprises one or more central processing units (CPUs) 102, 103, and 104. The CPUs 102-104 suitably operate together in concert with memory 110 in order to execute a variety of tasks. In accordance with techniques known in the art, numerous other components may be utilized with computer system 100, such a input/ output devices comprising keyboards, displays, direct access storage devices (DASDs), printers, tapes, etc. (not shown).

Although the present invention is described in a particular hardware embodiment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

The present invention provides a system and method of using simple XML value indexes without exact path information for more specific XPath queries. The present invention includes two parts. The first part is a highly efficient back-tracking algorithm to find if an XML index created with an XPath pattern contains exactly or more than the result of an XPath query. This is desirable in determining if an XML index can be used for an XPath query. Second, the present invention includes an algorithm that uses XML value indexes without path information for XML queries that are more specific than the index patterns in answering the inexact matching queries. The present invention uses simpler value indexes for inexact matching queries, which has not been done in the prior art.

The present disclosure assumes that the XML database storage scheme is as disclosed in U.S. patent application publication no. 20070043743 entitled "Packing Nodes into Records to Store XML XQuery Data Model and Other Hierarchically Structured Data" and U.S. patent application publication no. 20060004858 entitled "Self-Adaptive Prefix Encoding for Stable Node Identifiers", which are both incorporated herein by reference. However, the principles of the present invention can be applied to similarly structured XML and hierarchical data storage schemes.

In accordance with an embodiment of the present invention, the method of using inexact matching XML value indexes for queries includes the following steps:

1) Order index candidates based on heuristic rules, and matching will be according to that order. The first matched index will be chosen instead of exhaustive search to save the matching cost.

2) Decompose XPath query tree into a list of single-path (one line) XPath expressions, and their logical relationships (AND/OR).

3) Each index XPath pattern from the candidate list is matched against the list of single path XPath expressions one-by-one. The matching is either exact (equivalent) or inexact (containing). Index ANDing/ORing plan at DocID or NodeID level is created based on matching result. Additional rules apply to determine if inexact matches becomes an exact match.

4) At runtime, for inexact matches, a verification step applies to reduce the candidate result set to the exact result set.

There are a number of advantages with the present invention. These include: there is a minimum overhead for index storage and maintenance as the index contains minimum information; these indexes can still be used for a large set of queries using the inexact match; and an inexact match may become an exact match with extra information contained in the XPath queries that other methods do not use, such as the constraints on the level from the NodeID.

1. Introduction

In accordance with an embodiment of the present invention, initially an XML value index is created using an XPath pattern and a type for the key values. For example, we can index all the descriptions in a product catalog stored in an XML column of a table, using syntax similar to that of DB2 as follows:

```
CREATE INDEX IX1 ON MyCatalog(XCatalog) XMLPATTERN
'/catalog/category/product/description' AS "xs:string" LENGTH(50);
```

The created index contains the following index entries: (keyvalue, DocID, NodeID, RID), where NodeID is encoded using a prefix-encoding, for example, 02.08.1A.04, such that a NodeID is the prefix of NodeIDs of its descendants. The index entries can be organized using a B+ tree, or other index structure with the keyvalue as the search key.

The path of the above index, known as the pattern, does not contain a descendant axis. It can be used to answer an XPath query like: '/catalog/category/product [description="Shoe"]'. For this case, the index can provide the node identities (DocID, NodeID) for all the products in the query that satisfy the predicate. In this case, we say that the query and index pattern have an exact match. However, the index cannot be used to answer query: '/catalog//product [description="Shoe"]' without schema information.

Sometimes the index can be created using a less specific XPath pattern containing a descendant axis, for example: XML Pattern for index: '//product/description' or '//description'

An index with one of the above patterns can be used to answer query:

```
'/catalog/category/product[description = "Shoe"]', or
'/catalog//product[description = "Shoe"]',
``` where the index XML pattern (result) contains the query (result), and we say that the query and index pattern have an inexact match. Note that '//product[description="Shoe"]' is an exact match to index pattern '//product/description'. When an inexact matched index is used for a query, the index may contain more data than the query result, and we need to reduce the candidate set to the exact result by adding filter conditions on the node identities and also verify by access to the stored XML data.

2. Xpath Representation

General XML queries, such as XQuery, can be reduced to XPath expressions. We focus on XPath path expressions in the following description. Both XML pattern for an index and XPath queries can be represented in a binary tree. Each step in a path expression, represented by an XPath Step (XPS) node, contains information about its axis, node test/name test, and has two (possibly empty) children—its predicate (left) and its next step (right). The next step is either empty or another XPS. The predicate can be another path expression, represented by an XPS-rooted sub-tree, or functions, operators, or comparison, and represented using a function node (FUN node).

Figure 2:
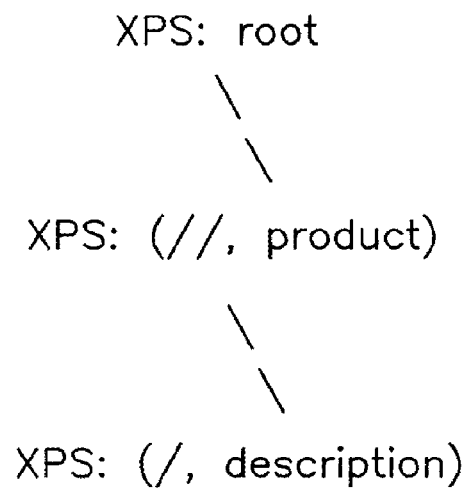
FIG. 2 shows a tree representation of an exemplary XML pattern in accordance with an embodiment of the invention.
Figure 3:
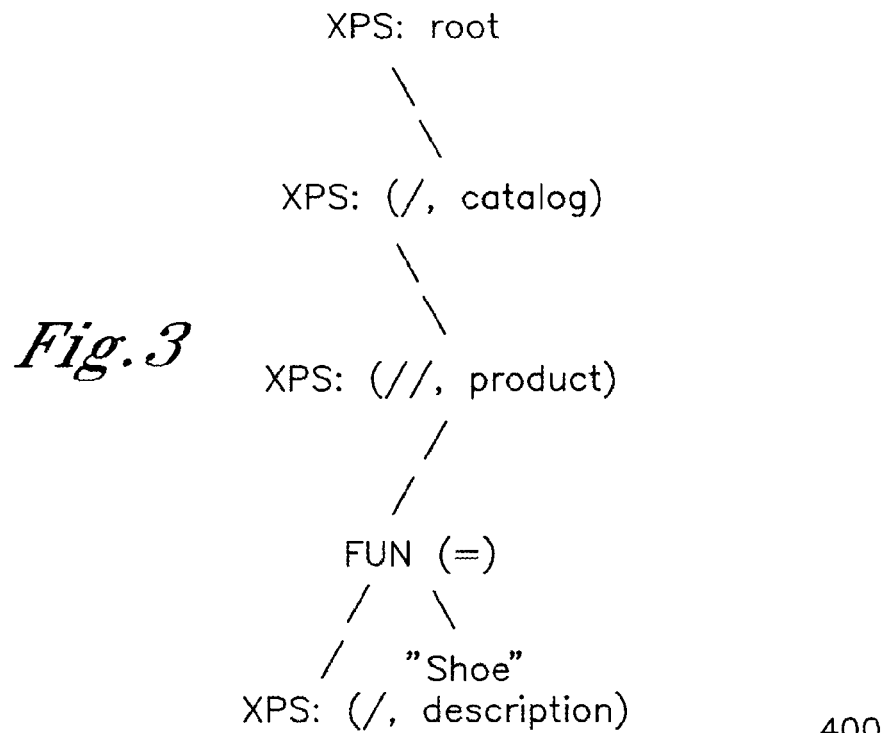
FIG. 3 shows a tree representation of an exemplary XML pattern in accordance with an embodiment of the invention.

For example, the XML pattern '//product/description' can be represented as the tree shown in FIG. 2. Similarly, query '/catalog//product[description="Shoe"]' can be represented as the tree shown in FIG. 3. When an XPath query or pattern tree is a single path, it can be represented using an array.

3. Main Procedure

Figure 4:
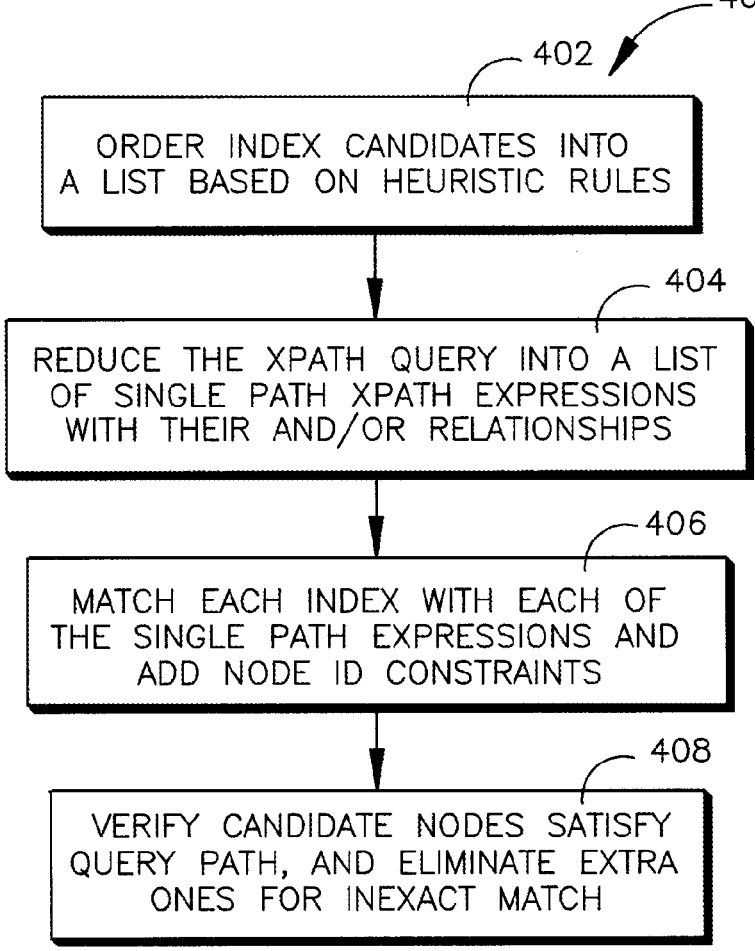
FIG. 4 shows a flow chart of a method of query processing in accordance with an embodiment of the invention.

The main procedure in accordance with one embodiment of the invention is shown in FIG. 4. The system receives an input XPath query, and a list of index candidates. The system evaluates the query using one or more indexes if there is a match.

FIG. 4 shows four main steps in a method 400 of using XML value indexes to filter XML documents in an embodiment of the present invention. In step 402 index candidates are ordered into a list based on heuristic rules. In step 404 the Xpath query is reduced into a list of single path Xpath expressions with their AND/OR relationships. In step 406 each index is matched with each of the single path expressions and add NodeID constraints. In step 408 candidate nodes are verified that they satisfy the query path and extra ones are eliminated for inexact match.

4. Ordering Index Candidates

In step 402, the following heuristic rules may be used to help reduce the matching cost for an index XPath pattern:

(1) A pattern without a descendant axis is better than one with a descendant axis.

(2) A pattern without a wild card name test ("*") is better than one with a wild card.

(3) A pattern with more steps is better than one with fewer steps. For the list of index candidates, we order them into a sequence based on these rules.

Figure 5B:
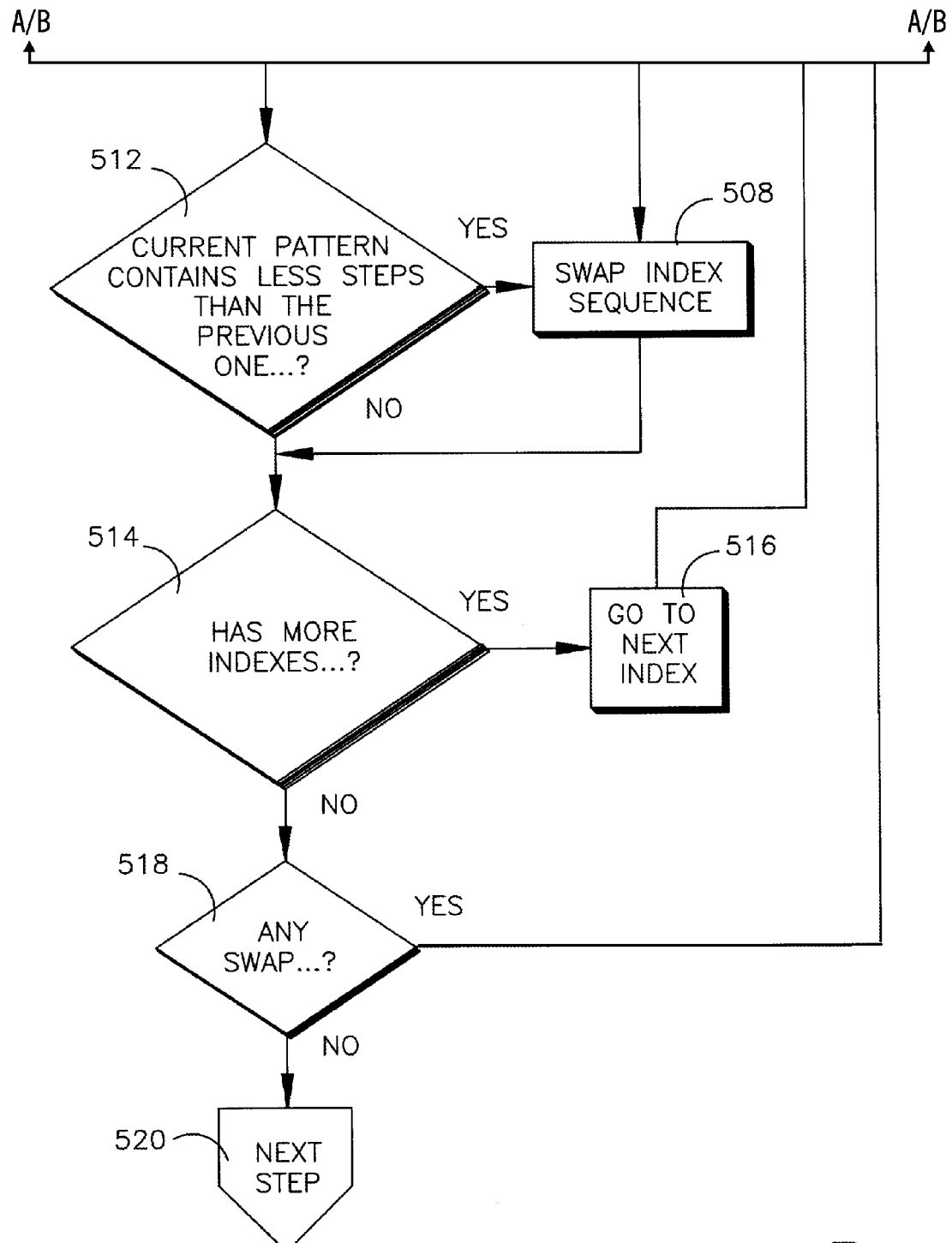

FIG. 5A and FIG. 5B show a flow chart of a process 500 for implementing the above heuristic rules in ordering index candidates in accordance with an embodiment of the invention. That is, step 402 in FIG. 4 may be implemented using the process 500. In an initial state 502, the system receives an input Xpath query and a list of index candidates. Step 504 will cause the process to loop through all of these index candidates one at a time. Step 506 determines if the current pattern in a selected index candidate contains a descendant and the previous one does not. If this is true, the process moves to step 508 and the position of the current index is swapped with the previous one. If the step 506 decision was no, the process moves to step 510, which determines if the current pattern does not contain a wildcard and the previous one does and either both patterns contain descendant or neither contain descendant. If this is the case, the process moves to step 508 and a swap is made. If not, the process moves to step 512, which determines if the current pattern contains fewer steps than the previous one and either both patterns contain descendant or neither contain descendant, and either both patterns contain wildcard or neither contain wildcard. If so, the process moves to step 508 and a swap is made. If not, the process moves to step 514.

Furthermore, the process also proceeds to step 514 after each swap in step 508. Step 514 determines if there are any more candidate indexes. If so, the process goes to the next index, step 516, and then operates on the next index beginning with step 506 until step 514 is reached again. If step 514 determines that the last candidate index has been processed step 518 determines if there has been any swaps made in step 508 with any of the candidate indexes. If there has been a swap, the process 500 moves to step 504 and steps 506-516 are repeated again for the entire list of candidate indexes. When step 518 determines that there were no swaps in the previous iteration, the index candidates will have been placed in an ordered list according to the above-described heuristic and step 520 returns the process back to the now-completed step 402 in FIG. 4.

The process 500 may be modified to perform ordering for a different set of heuristic rules within the teachings of the present invention. For example, for different applications having different kinds of queries, different kinds of data, different computational constraints, etc. other heuristic rules, or additional rules may be employed besides the three used in the exemplary embodiment herein.

5. Reducing Xpath Query into Single-Path Expressions

Since an XML index pattern is a single-path expression, for easy matching with XPath queries, we decompose and reduce an XPath query into a list of single-path expressions together with their relationships (AND/OR). For example, a query '/catalog//product[description="Shoe" and price>100]' can be reduced into two single-path expressions with the AND relationship:

'/catalog//product/description'
AND
'/catalog//product/price' where the condition for AND is for the levels up to "product" (same NodeID value except for the last level, denoted by NodeID(−1)).

In the above example, we call the AND relationship explicit as there is FUN node with "and" in the predicate. In the following example, the AND is implicit because it is derived from the two children of an XPS node ("product"): predicate and next step:

'/catalog//product[description = "Shoe"]/pricehistory[price > 100]' is decomposed into:
'/catalog//product/description'
AND
'/catalog//product/pricehistory/price' where the condition for AND is for the levels up to "product", NodeID(−1, −2). In order to keep the relationships among single path expressions, a data structure called XPDA (XPath Predicate Array) is introduced. It will record the tree structure/relationships among all the single-path expressions.

Figure 6A:
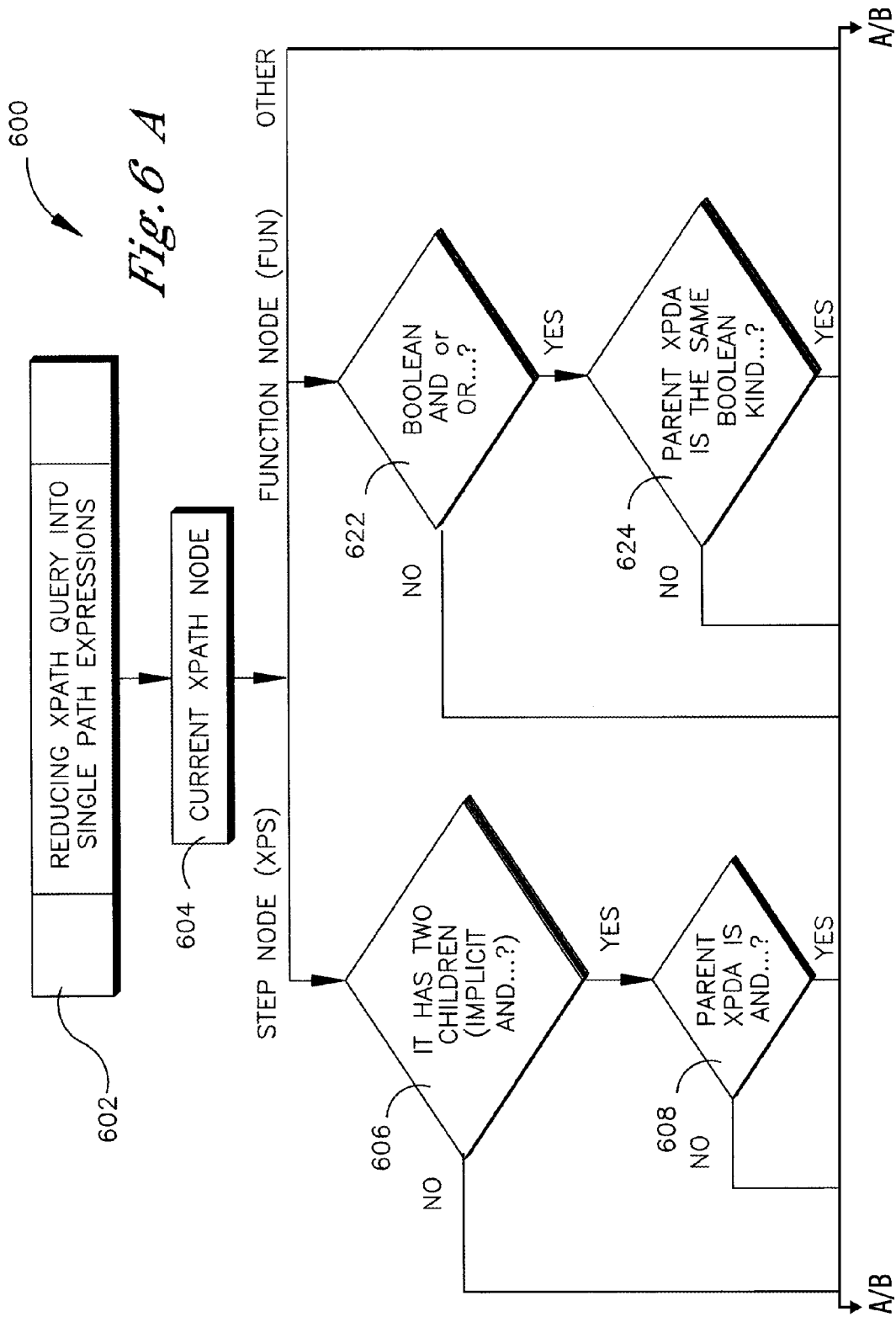
Figure 6B:
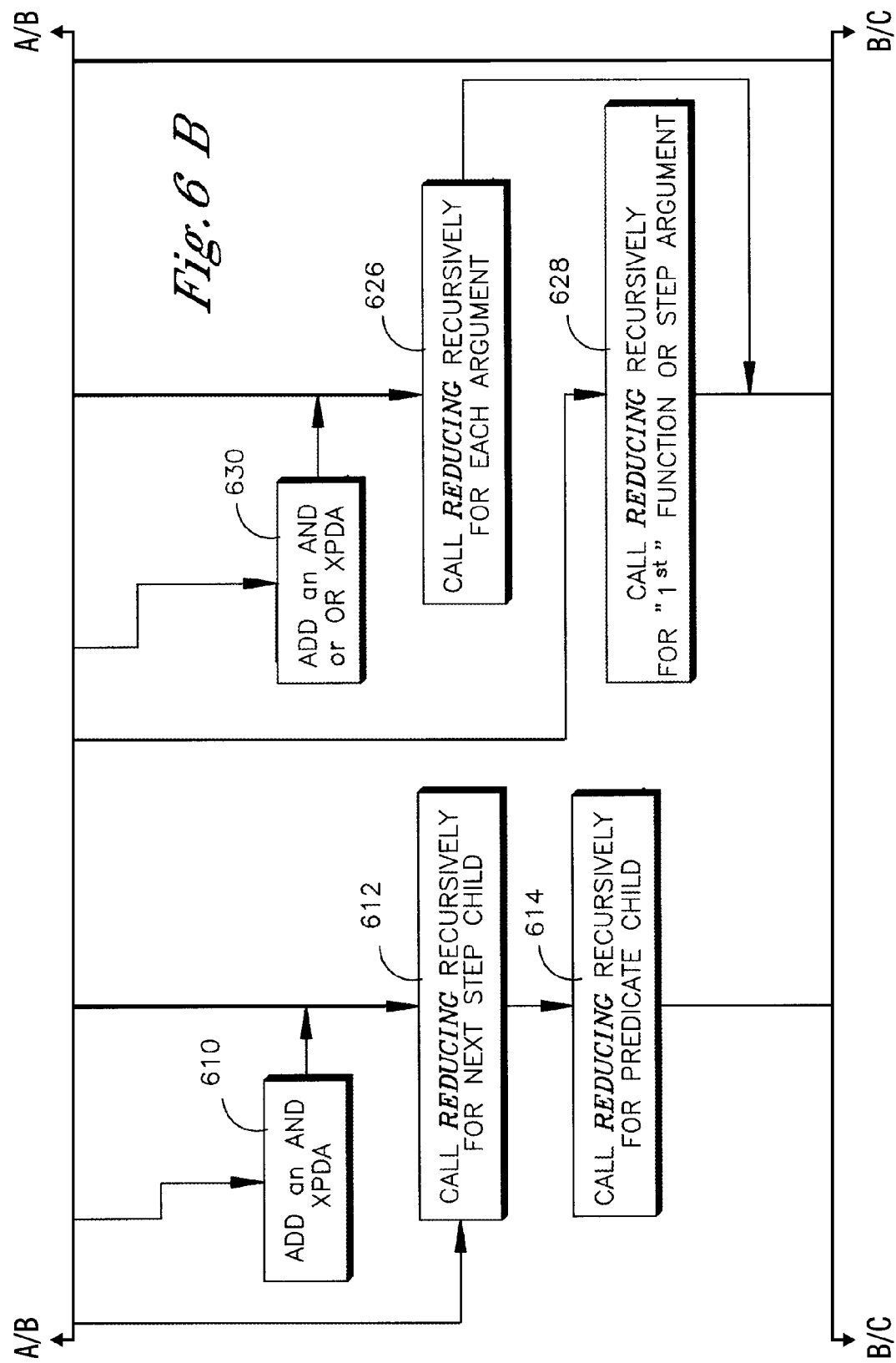
Figure 7A:
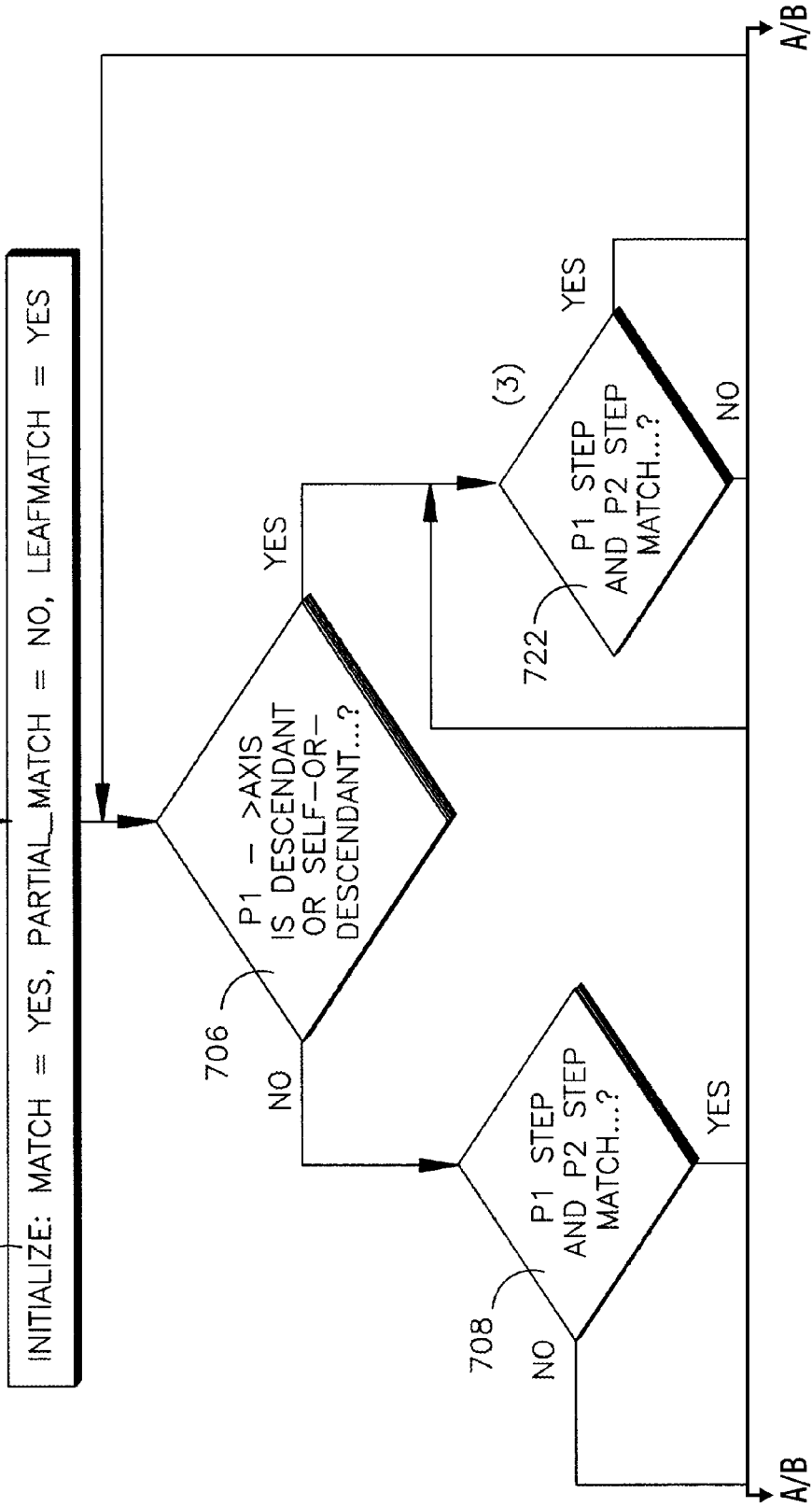
Figure 7C:
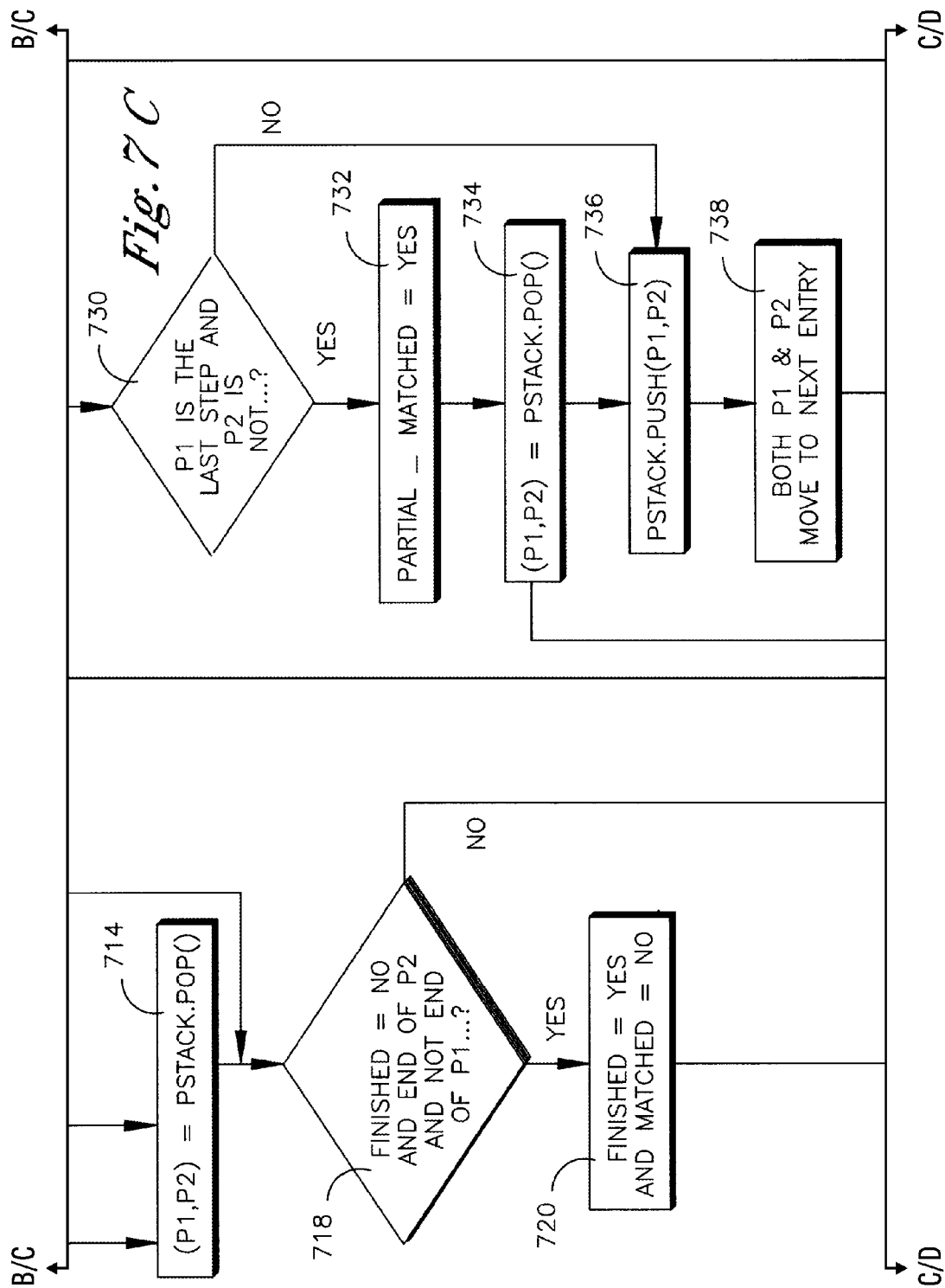
Figure 7E:
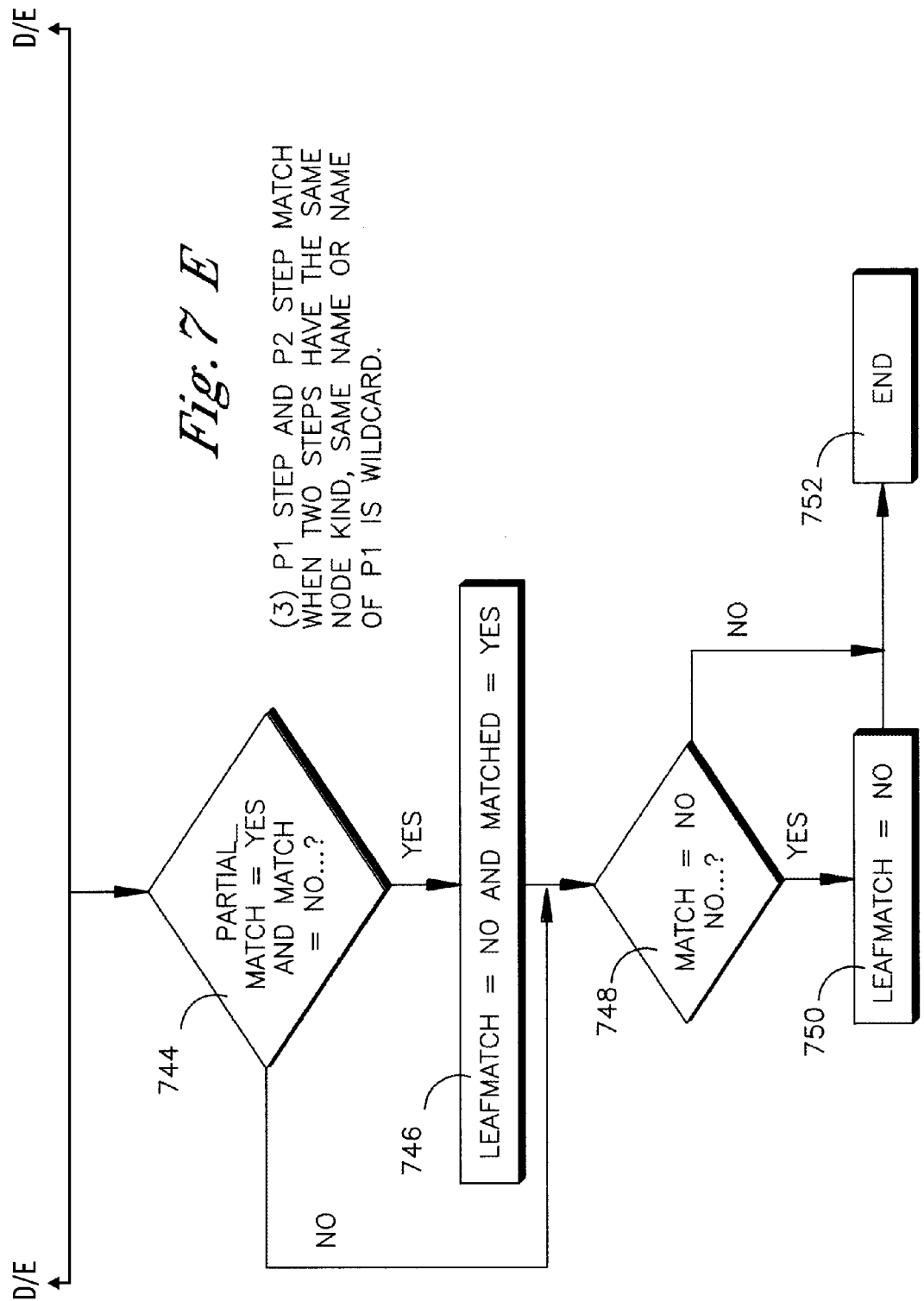

FIG. 6A, FIG. 6B and FIG. 6C show a flow chart of an exemplary process 600 that may be used to implement the reducing step 404 in FIG. 4. The process initial condition 602 is with all the index candidates having been ordered in step 402. Step 604 then determines if the current XPath node is a step node (XPS), a function node (FUN) or some other kind of node. If the current XPath node is a step node step 606 determines if the node has two children, which means that there is an implicit AND. If so, the process determines in step 608 if the parent XPDA is AND. If not, step 610 will add an AND XPDA. Next the process will move to step 612 where the process "REDUCING" will be done recursively for the predicate child. "REDUCING" is referring to the process 600 itself, so that step 612 will go through the process 600 recursively for the next step child. Step 612 will be performed also if step 606 determines that the step node did not have two children, or if step 608 determined that the parent XPDA is AND.

Next, step 614 will perform REDUCING recursively for the predicate child. Step 616 will then determine of the step is a leaf step. If so, step 618 will add all steps from the root to this leaf to an array, p2 as a single path expression and link to XPDA. Optionally, the matching step 406 may be performed here. That is, instead of going through process 600 completely before moving to the matching step 406, it is possible to do matching each time step 618 is reached in process 600. Once step 618 is complete, the process 600 then moves to the return step 620, which returns the process to step 404 in FIG. 4, which is now completed.

If the current path node as determined by step 604 was a function node, step 622 will determine if it contains a Boolean AND or OR. If so, step 624 determines if the parent XPDA is the same Boolean kind. If so, step 626 will call REDUCING recursively for each argument and the process will move to the return step 620. If instead, step 622 determines that there was not a Boolean AND or OR, step 628 will call REDUCING recursively for the first function or step argument and the process will move to the return step 620. In one embodiment of the invention, step 628 will first determine if the function is fn:not. If the function is fn:not, then step 628 will go directly to step 620. If step 624 determines that the parent XPDA is not the same Boolean kind, the process will add an AND or OR XPDA in step 630 and move to step 626.

In process 600, we didn't list explicitly details of keeping track of the common steps between single-path expressions. The way to track is to remember the common steps before branching in XPDA (AND only). From the common steps for AND, we can derive the condition:
(1) if all the common steps do not have a descendant axis, the condition is NodeID(commonsteps); else
(2) if the steps from the common to the leafs do not contain a descendant axis, the condition is NodeID(commonsteps−length1, commonsteps−length2), where length1 and length2 are the number of steps of the XPath expressions, respectively; else
(3) (both contain a descendant axis) the condition is NodeID (>=commonsteps), meaning at least common steps are the same.

6. Matching Indexes with a Decomposed XPath Query (Single Path)

The index matching step 406 with single-path expressions can be performed after the previous step or during the decomposition when a new leaf node is reached and a single-path expression is produced as process 600 in FIG. 6A, FIG. 6B and FIG. 6C shows. For each single-path expression, we loop through the list of index candidates sorted in the beginning. Once an index is matched, we stop. We now describe details of the matching of an index pattern with the single-path query. We use two arrays (or lists) to keep steps of the two path expressions. P1 and P2 keep the current positions of the paths for index pattern and query, respectively.

A key aspect of the flow is when the index pattern step has the descendant or descendant-or-self axis, we will remember the position in the stack for back-tracking as the step can match any number of steps in the path query. Note that the W3C XQuery specification defines the semantics of descendant-or-self, as well as other terminology used herein. We will backtrack to the position when the current choice of matching does not work and will try another way of matching. The result of matching is one of three conditions: matched (exact or inexact), partial (pattern is shorter than query), or not matched.

Partial match means the XPath query contains more steps than the XML index pattern, for example, index is /a/b and XPath is /a/b/c, for this matching, index can be used for filtering. Leaf match means index and XPath leaf step matches, for example, index is /a/b and XPath is /a/b too. Another example is where index is /a/b and XPath is /a[b=5]. Only when index and XPath leaf matches, we can use high/low key for filtering.

The final AND/OR plan of using indexes is based on the matching result of indexes with the decomposed single-path expressions and their relationships kept in XPDA. If not all branches of OR are matched with indexes, there will be no index plan for OR. On the other hand, indexes can be used for any branches of AND.

FIG. 7A, FIG. 7B, FIG. 7C, FIG. 7D, and FIG. 7E show a matching process 700, which may be used in one embodiment of the invention to implement step 406 in FIG. 4. In the initial condition 702 the reducing step 404 has been completed. Step 704 will initialize the state of the system with match=yes, partial match=no and leafmatch=yes. Step 706 will determine if the P1 (index pattern) axis is descendant or descendant-or-self. If not, step 708 will determine if the P1 step and the P2 (XPath) step match. If it does, step 710 will determine if P1 is the last step and P2 is not. If this is the case, step 712 will record that there is a partial match and the process will move to step 714 which will pop the stack, so that it backtracks to the last matched descendant or descendant-or-self step. Like wise, if step 708 determined that P1 step and P2 step did not match the process moves to step 714.

If step 710 determines that P1 is the last step and P2 is not, then the process moves to step 716 and both P1 and P2 move to the next entry. After either step 716 or 714, the process determines performs step 718, labeled Finished=no and end of P2 and not end of P1. Note that "End of P2 and Not end of P1" means that there are no more steps left in P2, but there is at least one more step left in P1. Finished is an internal control flag, which means the matching of one index is done. Step 718 checks the above condition." If the answer if yes, the process is finished without a match, as shown in step 720, and the process moves to step 721, described below.

If the determination in step 706 was yes, the process moves to step 722, which determines if P1 step and P2 step match. A match occurs when two steps have the same node kind, same name or name of P1 is a wildcard. If there is no match, P2 moves to the next entry, step 724 and step 726 determines if it has reached the end of P2. If not, the process returns to step 722. If so, step 728 records that the process is finished without a match and the process moves to step 721.

In the case where step 722 determines that the P1 step and the P2 step match, the process moves to step 730 where it is determined if P1 is the last step and P2 is not. If the answer is yes, step 732 records a partial match, and step 734 is performed, which is an operation similar to step 714 described above, and the process moves to step 721. If the determination in step 730 was no, then step 736, labeled PStack.PUSH(P1,P2) is performed. Note that a stack is used to keep track of all the matched descendant steps so that we can backtrack. The push operation of the stack used in step 736 adds a step to the stack. The pop operation used in steps 714 and 734 removes a step from the stack. Next, both P1 and P2 are moved to the next entry in step 738. Step 740 will then determine of both P1 and P2 have ended. If so, step 742 records that the process is finished and step 721 will then determine if the process has finished or the end of P2, or the end of P1 has been reached. If not, the process returns to repeat step 706 and another loop is performed. Note that each loop matches one step. P1 and p2 move to the next step as a result of 716, or they backtrack to previously matched descendant step as indicated by step 734 or 718.

If the answer to step 721 is yes, step 744 determines if it has been previously determined that there is a partial match and no match for the leaf step. If the answer is yes, step 746 will record that P1 and P2 matches but leaf does not match. Note that partial_match means match but not leaf match, for example, index is /a/b and xpath is /a/b/c. Next, step 748 will determine if match=no. If so, step 750 will record there is no leafmatch and the process 700 ends with step 752. If step 748 has determined that match=no was not true, then the process also ends at step 752.

The following is an example of the matching process 700 on the following indexes and XPath:

```
Indexes: /a/*/c//g, /a/b/c/d, /a/b/c/e, //b/c//f
Xpath: /a/b/c[d=3 or e=4]/a/b/f
```

After sort the index will be:
1) /a/b/c/d, 2) /a/b/c/e, 3) /a/*/c//g, 4) //a/b//f After matching, the tree will look like FIG. 8. Where matches with indexes 1 and 2 are exact while match is index 4 is inexact. When a match is inexact, we derive constraints on the NodeIDs. For example, the XPDA5 (/a/b/d/a/b/f) has an inexact match with index 4 //a/b//f. We add constraint depth(NodeID)=6 to filter the candidate nodes from the index. In addition, the AND in XPDA1 will result in the first three levels from the result being exact. Therefore, we only need to verify the following three levels being a/b/f by access to the data.

7. Filtering Candidate Nodes and Verifying Results

After matching with indexes, we will determine how to use indexes to derive the query result by two steps:

(1) When a match is inexact, add constraints on the NodeIDs to filter candidate nodes. Next analyze the final index plan to determine whether the final result is exact or inexact. ANDing of exact match with inexact match may result in exact results. If the final result is inexact, what verification and further navigation plan is needed to verify and further evaluate the XPath query [reword this sentence].

(2) Go fetch data and traverse the hierarchical storage to verify and further evaluate the query.

The constraint that can be added to filter the result from an inexact matched index is the depth of the NodeIDs. If the single-path query contains no descendant or self-or-descendant axes, we know all the nodes must have a fixed depth, which is the same as the steps in the query. On the other hand, if the single-path query contains a descendant or self-or-descendant axis, then the depth is greater than or equal to the steps of the query.

Next, analysis is performed on the XPDA to derive the level of NodeIDs up to which the path is exact. When we verify from data, we only need to verify from that level on so as to reduce the cost. It is possible that ANDing of exact match with inexact match results in exact results. In that case, we don't need to verify anymore.

For the above example shown in FIG. 8, the XPDA5 (/a/b/d/a/b/f) has an inexact match with index 4 '//a/b//f'. We add constraint depth(NodeID)=6 to filter the candidate nodes from the index. In addition, the ANDing in XPDA1 will result in the first three levels from the result being exact. Therefore, we only need to verify the following three levels being 'a/b/f' by access to the data.

Another example follows that shows how an exact match ANDing with an inexact match can result in an exact result. Assume that we have query:

```
'/catalog/category/product[description = "Shoe" and price > 100]'
and two indexes with the following XPath pattern:
IX1: '/catalog/category/product/description'
AND
IX2: '//price'
```

First, we add constraint depth(NodeID)=4 for the second index IX2 so that the result may be reduced. The ANDing between IX1 and IX2 requires they have common NodeID up to "product" (3 levels). These three levels can only be /catalog/category/product. Therefore, the inexact match for IX2 will become exact after ANDing with IX1. There is no need to verify the ANDing result.

8. Using Indexes in Evaluating XMLEXISTS Predicate in SQL/XML

The above procedure can be used in evaluating the XMLEXISTS predicate in SQL/XML in various plans:

1) When XMLEXISTS is on a table that is the only table or the leading table of a join plan, or be an outer or inner table of a sort-merge join plan. The DOCID list, DOCID list ANDing and ORing can be applied. The verification/re-evaluation of the XMLEXISTS predicate can be performed after other join predicate.

2) When XMLEXISTS is on a table that is the inner table of a nested-loop join plan, the index can be used in one of two ways:

A) Use the DOCID list obtained from DOCID list, DOCID list ANDing or ORing, for filtering by applying DOCID IN (DOCID list) predicate.

B) Use (Keyvalue, DOCID) as the index search key to probe the index for either quick rejection of the XMLEXISTS predicate, or verification based on NodeID if there is a result, instead of expensive full scan of the XML document. This will be valuable if the selectivity of XMLEXISTS is high, or the documents are large.

In accordance with the present invention, we have disclosed systems and methods for using XML value indexes without exact path information to filter XML documents for more specific XPath Queries. Those of ordinary skill in the art will appreciate that the teachings contained herein can be implemented using many kinds of software and operating systems, including, but not limited to, XML-enabled database systems such as relational databases and native XML databases as well as middleware such as query gateways, federation, and information integration. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method for query processing comprising:
creating, via a processor, an index of a database;
ordering, via the processor, a set of index candidates from the index into a list based on heuristic rules, wherein the heuristic rules reduce a matching cost for an index pattern via a preference for a matching without a descendant axis over a matching with a descendant axis and via a preference for a matching without a wildcard over a matching with a wildcard and via a preference for a pattern with greater number of steps than for a pattern with fewer number of steps, wherein determination of the matching with or without a descendant axis is performed prior to determination of the matching with or without a wildcard, and wherein the determination of the matching with or without a wildcard is performed prior to determination of whether a current pattern contains fewer steps than a previous pattern; and reducing, via the processor, a query defining a query path into a list of single path expressions.

2. The method of claim 1 wherein extra index candidates for inexact match are eliminated.

3. The method of claim 1, wherein creating an index comprises creating an XML value index.

4. The method of claim 1, wherein a candidate result set is reduced to an exact result set while verifying that each index candidate matched against a list of single path expressions satisfies a query path.

5. The method of claim 1, wherein the matching comprises determining exact and inexact matches and determining when the inexact matches become exact matches.

6. A system for query processing, comprising:
a memory; and
a processor coupled to said memory, wherein said processor performs operations, said operations comprising:
creating an index of a database;
ordering a set of index candidates from the index into a list based on heuristic rules, wherein the heuristic rules reduce a matching cost for an index pattern via a preference for a matching without a descendant axis over a matching with a descendant axis and via a preference for a matching without a wildcard over a matching with a wildcard and via a preference for a pattern with greater number of steps than for a pattern with fewer number of steps, wherein determination of the matching with or without a descendant axis is performed prior to determination of the matching with or without a wildcard, and wherein the determination of the matching with or without a wildcard is performed prior to determination of whether a current pattern contains fewer steps than a previous pattern; and
reducing a query defining a query path into a list of single path expressions.

7. The system of claim 6 wherein extra index candidates for inexact match are eliminated.

8. The system of claim 6, wherein creating an index comprises creating an XML, value index.

9. The system of claim 6, wherein a candidate result set is reduced to an exact result set while verifying that each index candidate matched against a list of single path expressions satisfies a query path.

10. The system of claim 6, wherein the matching comprises determining exact and inexact matches and determining when the inexact matches become exact matches.

11. An article of manufacture for use in a computer system tangibly embodying computer instructions executable by said computer system to perform operations, the operations comprising:
creating, via a processor, an index of a database;
ordering, via the processor, a set of index candidates from the index into a list based on heuristic rules, wherein the heuristic rules reduce a matching cost for an index pattern via a preference for a matching without a descendant axis over a matching with a descendant axis and via a preference for a matching without a wildcard over a matching with a wildcard and via a preference for a pattern with greater number of steps than for a pattern with fewer number of steps, wherein determination of the matching with or without a descendant axis is performed prior to determination of the matching with or without a wildcard, and wherein the determination of the matching with or without a wildcard is performed prior to determination of whether a current pattern contains fewer steps than a previous pattern; and
reducing, via the processor, a query defining a query path into a list of single path expressions.

12. The article of manufacture of claim 11 wherein extra index candidates for inexact match are eliminated.

13. The article of manufacture of claim 11, wherein creating an index comprises creating an XML, value index.

14. The article of manufacture of claim 11, wherein a candidate result set is reduced to an exact result set while verifying that each index candidate matched against a list of single path expressions satisfies a query path.

15. The article of manufacture of claim 11, wherein the matching comprises determining exact and inexact matches and determining when the inexact matches become exact matches.

* * * * *